A. J. IMUS.
Corn-Planters.
No. 155,585. Patented Oct. 6, 1874.
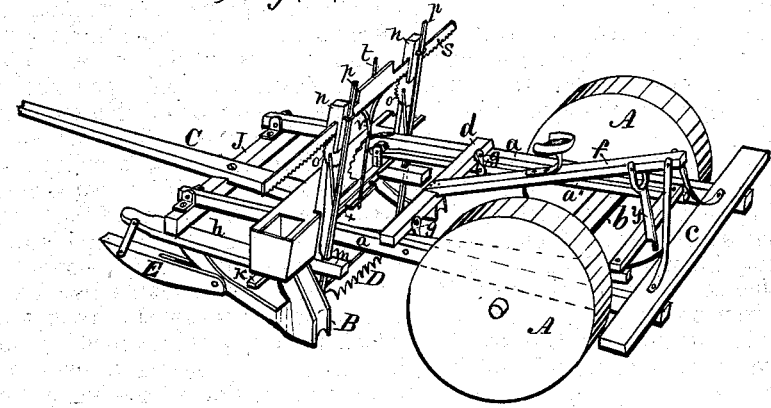
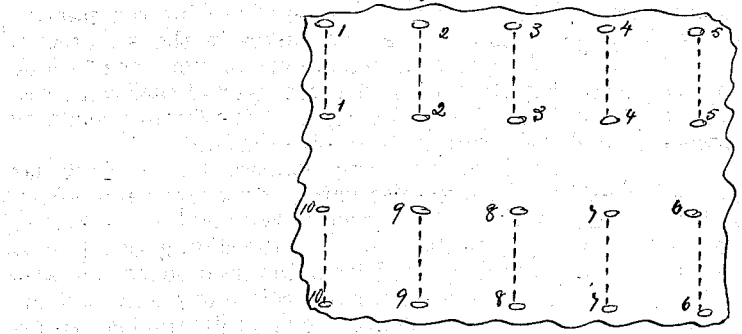

UNITED STATES PATENT OFFICE.

ANDREW J. IMUS, OF MOUNT AYR, IOWA, ASSIGNOR OF ONE-HALF HIS RIGHT TO D. F. SELLARDS, OF SAME PLACE.

IMPROVEMENT IN CORN-PLANTERS.

Specification forming part of Letters Patent No. 155,585, dated October 6, 1874; application filed July 18, 1874.

*To all whom it may concern:*

Be it known that I, ANDREW J. IMUS, of Mount Ayr, in the county of Ringgold and State of Iowa, have invented certain Improvements in Corn-Planters, of which the following is a specification:

The object of my invention is to provide a means of marking the land simultaneously with the dropping of the seed, and by the same motion of the same lever, in such a manner that a field may be planted in rows equidistant and parallel to each other in every direction without previous marking, and to elevate the runners in turning, or whenever desired. It consists in suspending a blade between the runners, and so combining it with the dropping mechanism that it will make a mark to indicate the position of the cross-rows and the precise parallel points where the seeds are deposited, all as hereinafter fully set forth.

Figure 1 of my drawing is a perspective view of a longitudinal half-section of my planter, and illustrates its construction and operation.

$a$ $a$ is one of the reaches, hinged at its front end to the frame-work connecting the runners, and rigidly attached near its rear end to the carriage-axle $b$. $c$ is a cross-piece, connecting the rear ends of the reaches $a$ $a$. $d$ is a central cross-piece, rigidly attached to the reaches $a$ $a$, and has a bar, $f$, extending rearward and upward to support a driver's seat. The rear and elevated end of this bar $f$ rests upon suitable braces or legs connected with the cross-piece $c$. $a''$ $a''$ represent a frame-form lever, pivoted and suspended upon the fulcrums $g$, rigidly attached to the reach $a$ $a$ and cross-piece $d$. $h$ is the top part of one of the common runners B. $j$ and $k$ are cross-bars, rigidly connecting the two parallel runners. C is a pole rigidly connected with the bars $j$ and $k$. $l$ is one of the loops attached to the cross-bar $k$ to receive the front ends of the frame-form lever $a''$ $a''$. It carries an anti-friction roller in its top, against which the free ends of the lever bear upward when the runners are elevated and held rigid with the parts mounted upon the wheels A. $m$ is one of the longitudinal bars rigidly attached to the bars $j$ and $k$ to support the dropping and marking mechanism. $n$ is a standard rigidly attached to the rear end of the bar $m$. $o$ is a toothed crank-wheel mounted upon the standard $n$. $p$ is one of the movable blade-bearers, passing through a mortise in the rear end of the bar $m$, and through a staple or loop at the top of the standard $n$, and is connected with the crank-wheel $o$ by means of the pivoted pitman $r$. D is a toothed marking-blade rigidly connected with the upright movable bearers $p$. $s$ is a horizontal movable bar, having a rack at each end to engage the crank-wheels $o$, upon which wheels it is retained by suitable side bearings. $t$ represents a lever or handle for imparting motion to the bar $s$. $v$ represents a bar or pin pendent from the bar $s$ designed to enter a suitable loop on the sliding valve-bar $x$, for the purpose of moving the same to open and close the valves in the seed-boxes. E represents an auxiliary runner, one of which is attached to the front part of each runner B, to regulate the depth of the furrows made by the runners to receive the seed.

In operating my planter, the rack-form bar $s$ is moved alternately to the right and left by means of the lever $t$. Each motion causes the pendent bar $v$ to move the sliding valve-bar $x$, and drop seed from the seed-boxes, and also causes the crank-wheels $o$ to partly revolve, and, by so doing, drop and lift the blade-bearers $p$ and the blade D. By this means the blade is caused to drop on the ground simultaneously with the seed, and to leave a distinct mark between the two points where the seeds were deposited. The runners B and wheels A leave marks longitudinal with the planter, and the blade D makes marks at right angles therewith, and the complete machine thus marks the field both ways, to guide the driver in a direct forward line, and to guide the operator in dropping straight cross lines or rows.

Fig. 2 is a diagram, illustrating the manner of marking and the advantageous results derived from my invention.

1 1, 2 2, 3 3 represent two parallel rows planted by the machine in passing from left to right. The dotted lines connecting the two rows represent the marks made by the blade D. 6 6, 7 7, 8 8 represent two paral'el rows planted by the return of the machine from the right to the left.

The driver, guided by the marks made by the first passage across the field, can readily make a second passage parallel to the previous track, and at uniform distance therefrom. The operator, guided by the transverse lines marked with the blade D, can readily pull the lever or handle $t$ and drop the seed and the blade at the right point of time and place required to continue the transverse lines or rows straight and equidistant from each other, and the necessity of marking a field previous to planting is dispensed with, and, consequently, much time and labor may be saved by the use of my improved planter.

To make the machine rigid and the runners inoperative, press down the rear end of the frame-form lever $a''$, and lock it by placing the swinging prop $y$ upon it.

I claim as my invention—

The marking-blade D, in combination with the valve-operating mechanism of a corn-planter, substantially as described, and for the purposes specified.

ANDREW J. IMUS.

Witnesses:
WM. T. LAUGHLIN,
D. F. SELLARDS.